Patented June 22, 1943

2,322,567

UNITED STATES PATENT OFFICE 2,322,567

PLASTICIZED AMINOPLAST

Gaetano F. D'Alelio, Pittsfield, Mass., assignor to General Electric Company, a corporation of New York No Drawing. Application November 12, 1940, Serial No. 365,379

14 Claims. (Cl. 260—33)

This invention relates to compositions comprising plasticized aminoplasts. More particularly it is concerned with heat-curable compositions comprising a potentially reactive, soluble, fusible aminoplast and a plasticizer therefor comprising an aryl (mono or poly) compound having attached to the aryl nucleus at least one sulfonylmorpholine radical. Examples of such aryl compounds are benzene monosulfonylmorpholine,

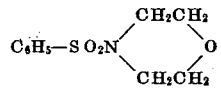

benzene di-sulfonylmorpholine,

benzene tri-sulfonylmorpholine,

para-toluene mono-sulfonylmorpholine,

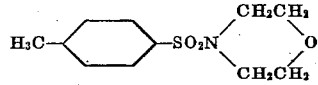

para-toluene di-sulfonylmorpholine, naphthalene sulfonylmorpholines, etc. The scope of the invention also includes products comprising a cured aminoplast having incorporated therein, prior to curing, an aryl sulfonyl morpholine.

As is well known, aminoplasts are synthetic resins derived from amino (including imino) or amido (including imido) compounds, a typical example being urea-formaldehyde resin (reference: Modern Plastics, vol. 17, No. 2, October, 1939, page 433; Patent 2,214,851, D'Alelio). Other examples of aminoplasts are aminotriazine-aldehyde resins, e. g., melamine-formaldehyde resins, protein-aldehyde resins, e. g., casein-formaldehyde resins, aniline-aldehyde condensation products, resinous condensation products of aldehydes such as formaldehyde with polyamides as, for instance, malonic diamide, maleic diamide, fumaric diamide, itaconic diamide, etc.

In the commercial utilization of aminoplasts in the plastics and coating arts, it is frequently necessary to modify the potentially heat-curable aminoplast by incorporating therein a plasticizer in order that the aminoplast will flow properly in the particular coating composition or, in the case of thermosetting aminoplast molding compositions, will show good flow characteristics during molding. Particularly in the molding of heat-curable, plasticized aminoplasts it is important that the plasticizer have certain particular characteristics. It should improve the flow of the molding compound during molding without retarding the curing of the resin at molding temperatures. It should be compatible with the aminoplast both at normal and at elevated temperatures and should not "bleed" from the aminoplast during or after molding. It should not discolor, or impart an odor to, or lessen the water resistance, electrical properties, mechanical strength and other useful properties of the cured aminoplast. The substances that are able to meet these requisites are extremely rare. Urea and various substituted ureas, phenol, toluene sulfonamides and acid bodies heretofore have been used or suggested as plasticizers for aminoplasts, but none has been entirely satisfactory. In mose cases the improvement in plasticity was attained at the sacrifice of some other useful property of the aminoplast.

I have discovered that the aryl sulfonylmorpholines constitute a class of materials that meet the above-mentioned requirements for a plasticizer for aminoplasts. These morpholines not only effectively plasticize the heat-convertible aminoplasts so that the aminoplast has good flow characteristics during molding, but they accomplish this result without retarding the curing of the aminoplast during molding. Furthermore, the aminoplast is plasticized without any noticeable decrease in the other valuable properties of the heat-hardened aminoplast, such as heat- and water-resistance, dielectric strength, mechanical strength, surface appearance, color, odor, etc. This was quite surprising and unexpected, since in no way could it have been predicted from the known properties of aryl sulfonylmorpholines, especially since they contain an ether linkage, or of aminoplasts that such morpholines would be compatible with an aminoplast and would serve not only effectively to plasticize the heat-curable aminoplast but would do this without retarding its curing rate and without sacrifice of the useful properties of the cured aminoplast.

The organic compounds used in practicing the present invention may be represented by the formula $X—(Y)_n$, where X represents any aryl nucleus, Y represents the radical

where R represents a member of the class consisting of hydrogen and monovalent hydrocarbon radicals, and $n$ is an integer ranging from 1 up to the combining power of the particular aryl nucleus. For example, in the case of a mono-aryl nucleus $n$ may be, for example, from 1 to 6, inclusive, but preferably is either 1, 2 or 3; similarly, in the case of a poly-aryl nucleus, for instance the diphenyl radical $C_6H_5—C_6H_4—$, $n$ may be, for example, from 1 to 10, inclusive, but preferably is either 1 or 2 per phenyl nucleus.

Illustrative examples of aryl radicals that X in the above formula may represent are phenyl, halogeno-aryl (e. g., halogeno-phenyl), alkylated aryl (e. g., alkylated phenyl), hydroxylated aryl (e. g., hydroxy phenyl), alkoxy aryl (e. g., alkoxy phenyl), aryloxyaryl (e. g., phenoxyphenyl), naphthyl, etc. Illustrative examples of monovalent organic radicals that R in the above formula may represent, in addition to hydrogen, are substituted or unsubstituted hydrocarbon radicals, e. g., aryl (including naphthyl), aralkyl, alkyl, alkaryl, acyl, hydrocyclic, heterocyclic, etc., radicals or nitro, halogeno, aceto (acetyl), carboalkoxy, acetoxy, etc., derivatives of such radicals.

More specific examples of the general class of compounds constituting the plasticizers with which this invention is concerned, in addition to those heretofore mentioned, are ortho-ethylphenyl sulfonylmorpholine, para-methylphenyl sulfonylmorpholine, para-hydroxyphenyl sulfonylmorpholine, 2, 4, 6-trichlorophenyl sulfonylmorpholine, para-butoxyphenyl sulfonylmorpholine and para-(beta acetoxy) ethylphenyl sulfonylmorpholine, wherein by "sulfonylmorpholine" is meant specifically the radical —$SO_2N(C_2H_4)_2O$.

*Example 1*

To a composition comprising a filler and a potentially heat-curable resinous reaction product of ingredients comprising urea and formaldehyde there was added 1%, by weight of the composition, of benzene mono-sulfonylmorpholine. The sulfonylmorpholine was incorporated into the composition by ball milling.

A control sample was prepared under identical conditions as the morpholine-plasticized composition with the exception that the sulfonylmorpholine was omitted.

Both the control and the plasticized samples were molded under the same heat, pressure and time conditions. The "flash" on the control sample was 11 mils thick as compared with 7 mils for the plasticized composition. In other words, the addition of only 1% of the sulfonylmorpholine plasticizer caused a reduction of approximately 36% in the thickness of material required to be cut off from the molded article. As well understood by those skilled in the art, the thickness of the flash is a relative measure of the plastic flow of the compound during molding.

When both samples were tested for plastic flow on a standard Baekeland flow tester, it was surprisingly found that the flow was increased from 12.5 mm. to 17.7 mm., or 41.6%, by the addition of the benzene mono-sulfonylmorpholine. Furthermore, as the temperature was increased, the morpholine-containing composition reached a plastic state in a much shorter time than the unplasticized composition and remained in substantially the same plastic state until it was cured. Specifically, it required the control sample about 35 seconds to reach the maximum flow (12.5 mm.) at which it cured, whereas it required only about 20 seconds for the plasticized material to reach the maximum flow (17.7 mm.) at which it cured.

*Example 2*

Same procedure was followed as described under Example 1 with the exception that para-toluene mono-sulfonyl-morpholine was used in place of benzene mono-sulfonylmorpholine with substantially the same results.

Compositions comprising potentially heat-curable resinous reaction products of ingredients comprising, for example, urea and formaldehyde or an aminotriazine (e. g., melamine) and formaldehyde, or urea, melamine and formaldehyde, may be used in place of the urea-formaldehyde compositions of Examples 1 and 2.

More specific examples of aminoplasts that may be plasticized with the above-described aryl sulfonylmorpholines are reaction products of aldehydes, for example formaldehyde or compounds engendering formaldehyde (e. g., paraformaldehyde, hexamethylene tetramine, etc.) with amido, imido, amino or imino compounds, or suitable mixtures thereof, for instance, urea, thiourea, diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylene ureas, methylol ureas, guanidine, dicyandiamide, guanyl urea, guanyl thiourea, biguanidine, aminotriazines, aminodiazoles, creatinine, guanoline, etc. In many cases the use of an aminotriazine, e. g., melamine, alone or in conjunction with other amido, amino, imido or imino compounds, yields particularly valuable aminoplasts for use in producing the new compositions of this invention. Illustrative examples of aminotriazines are triazines containing at least one amino group, e. g., melamine, ammeline, ammelide, formoguanamine, 2-amino-1,3,5-triazine, melam, melem, melon, 2,4,6-triethyltriamino-1,3,5-triazines, 2,4,6-triphenyltriamino-1,3,5-triazines, etc. Nuclearly substituted aminotriazines also may be used, e. g., 1-cyano-2-amino-4,6-dimethyl-1,3,5-triazine, 2-chloro-4,6-diamino-1,3,5-triazine, 6-methyl-2,4 - diamino-1,3,5 - triazine, 2 - alkyl-4-amino-6-hydroxy-1,3,5-triazines (for example, 2-methyl-4 - amino-6-hydroxy-1,3,5-triazine, etc), 2-aryl-4 - amino-6 - hydroxy-1,3,5-triazines (for example, 2-phenyl-4-amino-6-hydroxy-1,3,5-triazine, etc.), and the like. Suitable mixtures of aminotriazines may be employed. All of these amido, imido, amino and imino compounds are aldehyde-reactable organic compounds and all contain at least one active $-\underset{H}{N}-$ group.

Aldehydes other than formaldehyde or compounds engendering formaldehyde also may be employed in producing the aminoplast, for instance acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes.

The potentially heat-convertible aminoplasts and molding (moldable) compositions containing the same may be prepared as described in various copending applications of mine, for example as described in copending application Serial No. 363,036, filed October 26, 1940, and assigned to the same assignee as the present invention.

The amount of aryl sulfonylmorpholine which is incorporated into the potentially reactive aminoplast or molding composition made therefrom may be varied as desired or as conditions may require, but ordinarily the aryl sulfonylmorpholine is employed in an amount corresponding approximately to from 0.1 to 10% by weight of the aminoplast, from 0.5 to 4 or 5% being generally satisfactory for the usual aminoplasts.

Thermosetting molding compositions comprising potentially heat-curable aminoplasts plasticized with the above-described aryl sulfonylmorpholines may be molded into a variety of shapes under heat and pressure, more particularly at temperatures of the order of 100° to 200° C., preferably from approximately 120° C. to 180° C. The plasticized compositions show good plastic flow during molding. Molded articles of manufacture comprising the molded, heat-hardened molding compositions herein-described have a good surface finish, show no evidence of "bleeding" plasticizer, are well cured throughout, and show no appreciable loss in any of their useful properties due to the presence of the plasticizer comprising one or more aryl sulfonylmorpholines.

What I claim as new and desire to secure by Letters Patent of the United States is:

1. A composition of matter comprising a potentially heat-curable aminoplast and an aryl compound having attached to the aryl nucleus at least one radical corresponding to the structural formula

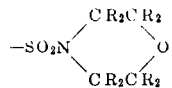

where R represents a member of the class consisting of hydrogen and monovalent hydrocarbon radicals, any other radicals attached to the said aryl nucleus being members of the class consisting of halogeno, alkyl, hydroxy, alkoxy and aryloxy radicals.

2. A composition of matter comprising a potentially heat-curable aminoplast and a mono-aryl compound having attached to the aryl nucleus at least one radical corresponding to the structural formula

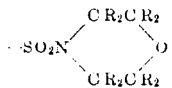

where R represents a member of the class consisting of hydrogen and monovalent hydrocarbon radicals, any other radicals attached to the said aryl nucleus being members of the class consisting of halogeno, alkyl, hydroxy, alkoxy and aryloxy radicals.

3. A thermosetting molding composition comprising a potentially heat-curable aminoplast and a plasticizer therefor comprising an aryl compound having attached to the aryl nucleus at least one radical corresponding to the structural formula

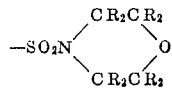

where R represents a member of the class consisting of hydrogen and monovalent hydrocarbon radicals, said aryl compound being otherwise unsubstituted.

4. A thermosetting molding composition comprising a potentially heat-curable aminoplast and a plasticizer therefor comprising a mono-aryl compound having attached to the aryl nucleus at least one radical corresponding to the structural formula

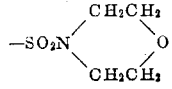

said mono-aryl compound being otherwise unsubstituted.

5. A composition comprising a potentially heat-curable resinous reaction product of ingredients comprising urea and formaldehyde, and a plasticizer for said reaction product comprising an aryl compound having attached to the aryl nucleus at least one radical corresponding to the structural formula

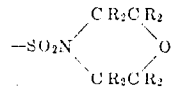

where R represents a member of the class consisting of hydrogen and monovalent hydrocarbon radicals, any other radicals attached to the said aryl nucleus being members of the class consisting of halogeno, alkyl, hydroxy, alkoxy and aryloxy radicals.

6. A composition of matter comprising a potentially heat-curable aminoplast having incorporated a small amount of a benzene sulfonylmorpholine, the benzene nucleus of the said sulfonylmorpholine being otherwise unsubstituted.

7. A composition of matter comprising a potentially heat-curable aminoplast having incorporated therein a small amount of para-toluene sulfonylmorpholine.

8. A composition comprising a potentially heat-curable resinous reaction product of ingredients comprising a urea, an aminotriazine and formaldehyde, and a plasticizer for said reaction product comprising a mono-aryl compound having attached to the aryl nucleus more than one radical corresponding to the structural formula

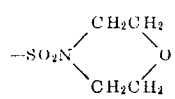

said mono-aryl compound being otherwise unsubstituted.

9. A heat-curable composition comprising a soluble, fusible resinous reaction product of ingredients comprising urea, melamine and formaldehyde, and, as a plasticizer for said reaction product, from 0.1 to 10% by weight thereof of an organic compound corresponding to the formula

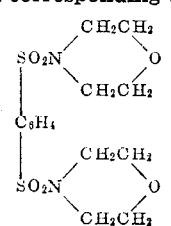

10. A product comprising the cured composition of claim 9.

11. A molded article of manufacture comprising the molded, heat-hardened molding composition of claim 4.

12. A composition of matter comprising a resinous reaction product of ingredients comprising a urea and an aldehyde, said reaction product having incorporated therein a small amount of a benzene sulfonylmorpholine, the benzene nucleus of the said sulfonylmorpholine being otherwise unsubstituted.

13. A heat-curable composition comprising a heat-convertible resinous reaction product of ingredients comprising urea and formaldehyde, said reaction product having incorporated therein a small amount of an organic compound corresponding to the formula

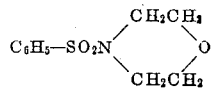

14. A product comprising the cured composition of claim 13.

GAETANO F. D'ALELIO.

CERTIFICATE OF CORRECTION.

Patent No. 2,322,567.  June 22, 1943.

GAETANO F. D'ALELIO.

It is hereby certified that error appears in the printed specification of the above numbered patent requiring correction as follows: Page 1, second column, line 15, for "mose" read --most--; page 5, second column, line 15, claim 6, before the words "a small" insert --therein--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.